United States Patent
Groh et al.

(10) Patent No.: US 12,174,920 B2
(45) Date of Patent: Dec. 24, 2024

(54) METHOD AND APPARATUS FOR DETERMINING A DISTANCE METRIC FOR DETERMINING A DISTANCE DIMENSION OF HETEROGENEOUS DATA POINTS

(71) Applicant: Robert Bosch GmbH, Stuttgart (DE)

(72) Inventors: Konrad Groh, Stuttgart (DE); Matthias Woehrle, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 18/154,276

(22) Filed: Jan. 13, 2023

(65) Prior Publication Data

US 2023/0222181 A1   Jul. 13, 2023

(30) Foreign Application Priority Data

Jan. 13, 2022  (DE) .................... 10 2022 200 288.1

(51) Int. Cl.
| | |
|---|---|
| *G06F 16/35* | (2019.01) |
| *G06F 18/21* | (2023.01) |
| *G06F 18/22* | (2023.01) |
| *G06F 18/2413* | (2023.01) |

(52) U.S. Cl.
CPC ...... *G06F 18/24147* (2023.01); *G06F 18/217* (2023.01); *G06F 18/22* (2023.01)

(58) Field of Classification Search
CPC .. G06F 16/434; G06F 16/45; G06F 18/24147; G06F 18/217; G06F 18/22; G06F 17/15; G06F 17/16; G06F 16/35; G01M 15/05; G01D 21/02; G05B 13/04
See application file for complete search history.

(56) References Cited

U.S. PATENT DOCUMENTS

| | | | |
|---|---|---|---|
| 11,556,746 B1 * | 1/2023 | Dasgupta | .................. G06N 5/04 |
| 2021/0326652 A1 * | 10/2021 | Hazard | .................. G06N 5/045 |

OTHER PUBLICATIONS

Lars Haendel, "Clusterverfahren zur datenbasierten Generierung interpretierbarer Regeln unter Verwendung lokaler Entscheidungskriterien," Dissertation, Jun. 26, 2003 (119 pages).
(Continued)

*Primary Examiner* — Apu M Mofiz
*Assistant Examiner* — Cindy Nguyen
(74) *Attorney, Agent, or Firm* — Maginot, Moore & Beck LLP

(57) ABSTRACT

A method determines a distance metric for determining a distance to a data point having heterogeneous classes of variables. The method includes providing training records each assigning a label to a data point, the training records partitioned into training data points of a training amount and validation data points of a validation amount, and training a data-based system model with the training amount, such that the data-based system model associates data points with a model output, respectively. The method further includes for each validation data point of the validation amount, determining a quality level of the data-based system model and a distance value to a nearest training data point for each of the heterogeneous classes of variables. The distance value to the nearest training data point is determined separately with respect to a respective class of variables.

14 Claims, 5 Drawing Sheets

(56) References Cited

OTHER PUBLICATIONS

Lutz Fehrmann, Alternative Methoden zur Biomasseschätzung auf Einzelbaumebene unter spezieller Berücksichtigung der k-Nearest Neighbour (k-NN) Methode, Dissertation, Göttingen, Univ., Oct. 2006 (162 pages).

Prasath et al., "Effects of Distance Measure Choice on KNN Classifier Performance—A Review," arXiv Preprint, arXiv:1708.04321, Sep. 29, 2019 (40 pages).

* cited by examiner

METHOD AND APPARATUS FOR DETERMINING A DISTANCE METRIC FOR DETERMINING A DISTANCE DIMENSION OF HETEROGENEOUS DATA POINTS

This application claims priority under 35 U.S.C. § 119 to patent application no. DE 10 2022 200 288.1, filed on Jan. 13, 2022 in Germany, the disclosure of which is incorporated herein by reference in its entirety.

The disclosure relates to methods that utilize a distance metric for evaluating a data point, such as in a Nearest Neighbor method, in particular for anomaly detection and the like. In particular, the disclosure relates to determining a distance metric for heterogeneous data points having multiple physical quantities.

BACKGROUND

When operating technical systems, system states or state profiles are typically evaluated. These are typically determined sensorily or model-based for a given time increment, i.e., a time point or period of time, and provided as a data point for further evaluation. An evaluation of such a data point can be carried out using, for example, physical-based or data-based analysis models.

Another way to evaluate data points for further reference data points is by, for example, using a Nearest Neighbor method based on a distance metric for determining a distance dimension of the data point to be evaluated from one or more reference data points.

SUMMARY

According to the disclosure, there is provided a method is provided for determining a distance metric for determining a distance of a data point to heterogeneous classes of variables as well as a corresponding apparatus.

According to a first aspect, a method is provided of determining a distance metric for determining a distance to a data point having heterogeneous variables, with the steps of:

providing training records each associating a data point with a label and partitioned into training data points of a training amount and validation data points of a validation amount;

training a data-based system model with the training amount such that the system model associates data points with a model output, respectively;

for each validation data point of the validation amount, determining a quality level of the system model and a distance value to a nearest training data point for each of the classes of variables, wherein the distance value to the nearest training data point is determined separately with respect to a respective classes of variables;

determining a distance value of a maximum quality level for each of the classes of variables; and determining the distance metric depending on the distance values of the maximum quality level for each of the classes of variables.

Data points typically have values that are assigned to different classes of variables, i.e. indications or physical quantities. Various methods use distance metrics for evaluating data points with respect to further reference data points to determine the location of the data point to be evaluated with respect to the reference data points.

For homogeneous quantities in a data point to be evaluated, a Euclidean distance or a distance dimension in the form of an L1 or an L2 standard can generally be specified as the distance metric. Conversely, for determining a suitable distance metric for data points where the values of the underlying physical quantities are in different ranges of values, the conventional distance metric is not readily usable. If, for example, the range of values of a variable in the data point differs significantly from a further variable in a data point to be evaluated, the distance dimension is usually dominated by the physical variable with the value range with the highest upper limit or with the lowest lower limit of the value range. This typically results in undesirable results in a downstream evaluation, for example the application of a Nearest Neighbor method.

To monitor or regulate technical systems, physical measured variables are recorded using a sensor system indicative of the current state of the technical system. Measurement of the metrics are obtained using sensors, such as pressure sensors, temperature sensors, accelerometers, vibration sensors, radiation sensors, mass flow sensors, and cameras, lidar or radar sensors read at predetermined scanning steps. Within a scanning step, individual physical variables, individual model values, but also time series of physical variables, or one or more camera-based image data or moving image data may be acquired with respect to a range of detection as respective classes of variables. Measurement data for the individual classes of variables thus recorded are generally combined as a data point for further evaluation and processed further.

Thus, a data point may comprise several variables, each corresponding to a single physical variable, a time series of a physical variable, image data of an imaging institution, or moving image data of an imaging institution.

A possible further processing is the evaluation in a Nearest Neighbor method in which a distance of the respective data point to be evaluated to other reference points must be determined. Depending on the resulting distance dimension or distance dimensions, decisions can thus be made regarding the presence of anomaly in an anomaly location or in decisions regarding the quality of the data point, for example when used as a training data point. Determination of the distance dimension is conventionally done using a distance metric that is typically construed based on a Euclidean distance.

When showing different variables, i.e. physical state variables, physical profile variables and/or image data, in data points, these can have different formats, wherein their elements are defined in different value ranges. For example, the data points may comprise classes of variables in the form of time series data, image data, moving image data, as well as individual scalar values of state variables. For example, a data point x may be indicated by a following format $$x = \begin{Bmatrix} a \\ b \\ y1 \\ \vdots \\ yn \\ z1 \\ \vdots \\ zm \\ B \end{Bmatrix}$$

wherein a, b individual values corresponding to a respective value of a state variable, y1 ... yn and z1 ... zm time series data of time periods 1 ... n and 1 ... m correspond to a corresponding physical variable and B correspond to a matrix of pixels of image data, wherein a, b, y, z and B each represent a variable class.

The classes of variables can thus each be present in different ranges of values, so that, in the conventional determination of a distance dimension, the state variable with the largest value range generally dominates.

An adjustment of a distance metric, i.e. a measurement method for determining a distance dimension, is not easily possible because the influence of the respective state variable on the system behavior is not known. In this regard, the above method suggests determining a distance metric that evaluates the impact of the respective state information on the behavior of the system. To this end, the above method initially provides for a data-based system model mapping data points in a corresponding measured or otherwise determined system variable. Thus, the system model serves to evaluate the technical system for which a data point indicates a state for a given time step, time, or time period.

The system model thus provides an opportunity to evaluate a distance function. Nearby data points should have a higher quality on average than those that have a greater distance; that is, one can expect a (weak) correlation between a distance function and a quality function for the trained system model. This correlation is not expected if the system model has not been trained with the data.

The training of the system model is based on a training amount of training data previously extracted from a validation of training data sets. The system model is trained until convergence, i.e. until a convergence criterion is met. That is to say, until the value of the quality function no longer substantially changes.

The validation amount may be selected according to a conventional scheme: e.g. a 60/20/20 split with 60% training data points of the training amount, 20% validation data points of the validation amount and 20% test data points in order to finally assess the trained quality function. However, other divisions are contemplated. If a meta-parameter is present, this can also be considered (e.g., the training data could only be from Munich and Stuttgart, the validation data from Magdeburg).

It may be contemplated that the quality measure for the respective validation data set is determined depending on a difference between a model output of the system model with respect to the label of the relevant validation data set.

The validation datasets of the validation amount are used below to determine the corresponding distance metric. To this end, a quality measure is determined for each validation data point using a predetermined quality function. The quality function may, in the simplest case, indicate the deviation between the model evaluation with the system model at the validation data point and the system variable entered by the relevant validation data set. Further conceivable quality measures are the loss of the trained model as well as the Softmax probability of prediction.

Subsequently, a distance value to a nearest training data point of the training amount is determined for each validation data point. The nearest training data point is determined, respectively, only for one of the classes of variables of the data point. The nearest training data point corresponds to the training data point with the shortest distance value to the validation data point in the respective classes of variables. The distance value may be determined based on a simple difference or from a Euclidean distance at multi-dimensional variables. This is performed for each of the variables in the data points of the validation datasets.

For example, if a validation record or training data set consist of a time series vector of a pressure signal, a time indication (scalar) and a temperature indication (scalar), then each time the distances are determined to the nearest training data points for the pressure signal, the time information and the temperature information for all validation sets, with regard to the particular dimension of the respective variable, namely the distance between the time series vectors of the pressure (as Euclidean distance) of the respective two data points or with regard to the time interval of the time information of the respective two data points or with regard to the distance of the temperature indications of the respective two data points.

Thus, a quality and a distance value are obtained for each validation data set and for each class of variables in the considered data points. For each of the classes of variables, while masking out edge effects, i.e., within the range of values of the distance values of between e.g. 5% and 95%, of the determined maximum distance value, a maximum quality is now determined and the relevant associated distance value is assigned class of variables.

The distance values thus determined for the classes of variables of the data point can now be assigned a weighting of the respective class of variables. For this purpose, the determined associated distance values can be normalized to 1 and can be used in determining the Euclidean distance to apply the respective square term assigned to the class of variables.

In this way, a distance metric is obtained to determine distance dimensions for data points of any heterogeneous format.

For example, such a distance dimension determined with a distance metric determined in this way may be used to determine anomalies based on a distance of a data point to be evaluated from further data points. Furthermore, such a distance dimension can also be used to evaluate data points or data point sets in which the training data space is analyzed to determine gaps in the training data space or outliers of data points from the training data space, and thus to determine training data sets for further training of a corresponding model.

According to a further aspect, a device for carrying out one of the above methods is provided.

BRIEF DESCRIPTION OF THE DRAWINGS

Embodiments are described in more detail below with reference to the accompanying drawings. Here.

DETAILED DESCRIPTION

Figure 1:
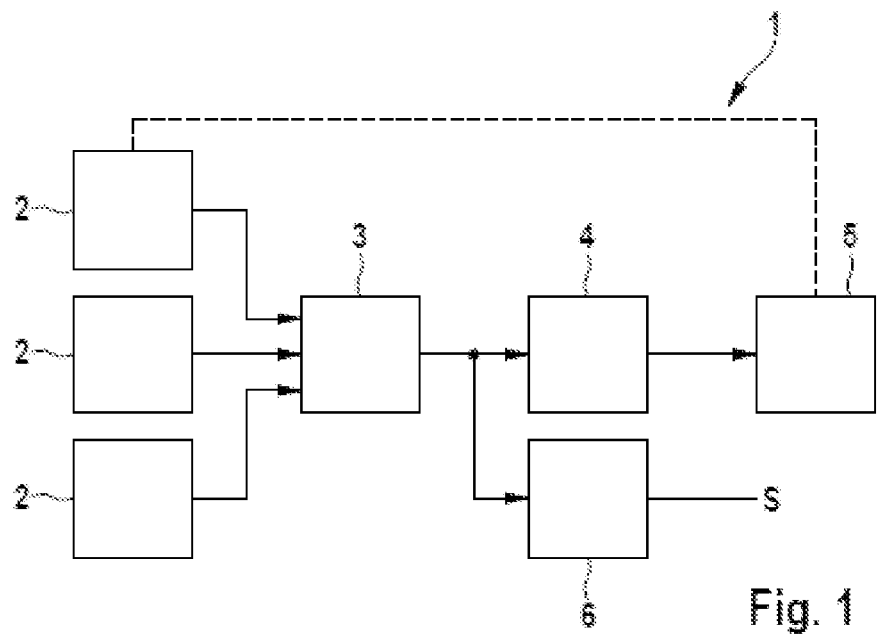
FIG. 1 shows a schematic illustration of a technical system having a number of sensors that are used to record state information about the technical system at a time or period of time.

FIG. 1 shows a schematic representation of a technical system 1 having a series of sensors 2 configured to record state information of the technical system 1. For example, these sensors may include pressure sensors, temperature sensors, accelerometers, vibration sensors, radiation sensors, mass flow sensors, as well as cameras, lidar or radar sensors, and the like. The state information has a format and may be of a time step, i.e., a time point or a time period, as a scalar variable, as time series information of a variable, as image information, or as moving image information.

To further process the sensor data, it is recorded at predetermined time points or at predetermined time periods and placed in a multi-size data format in a formatting block 3. The data format leads to a data point, which is in the form of a data vector or data tensor. This combines the different classes of variables of the state information and maps them each with a different number of elements in the data point.

The data point can now be evaluated in a data-based system model 4 to determine a system variable that serves to monitor and/or control a technical device 5, in particular to control a downstream function based on the system variable, to regulate the technical device 5, or to monitor the technical system 1.

The ranges of values of the individual state information in the classes of variables may differ significantly from one another.

Furthermore, an anomaly detection block 6 may be provided, which obtains the respective data point to be evaluated. The anomaly detection block 6 may be configured to determine a distance dimension to reference data points that characterize normal operation. The reference data points are predetermined and the distance dimension of the data point to be evaluated may be determined using a distance metric.

For example, the distance metric may be based on a weighted L2-Norm that provides its own weight factor for each class of variables.

If the distance measure determined from the predetermined distance metric is above a predetermined anomaly wave value, an anomaly is detected and signaled by a signal S, respectively.

Figure 2:
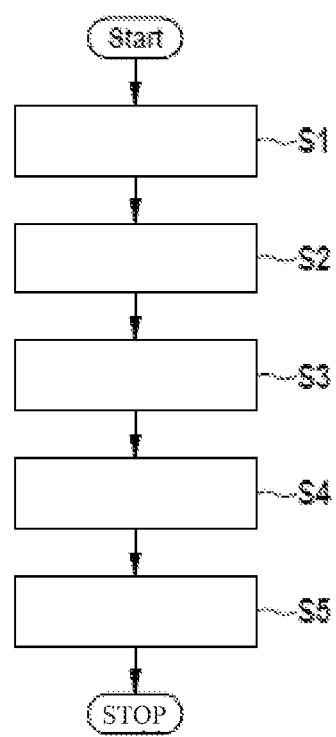
FIG. 2 shows a flow chart illustrating the method of determining a distance metric of the technical system.

FIG. 2 schematically shows a flow chart illustrating a method for determining metric parameters of the distance metric that may be used in the anomaly detection block 6. The method may be executed in a computer and is for parameterizing an anomaly detection model in anomaly detection block 6.

To this end, training data sets are first provided in S1, which assign data points to a label, wherein the label corresponds to a measured, simulated or modeled system variable or other valuable describing system behavior. In particular, the system variable is selected which shows these dependencies on all of the classes of variables used in the data points of the training data sets. The training sets are divided into a training amount and a validation amount.

Using the training amount of the training records, in step S2, the data-based system model 4 or other data-based model is trained to map the training data points of the training amount to the correspondingly assigned label.

In step S3, a quality measure corresponding to a predetermined quality function is determined for each data point of the validation amount of the training records. A possible quality function may correspond to a simple difference between a model output of the data-based system model 4 and the label at each of the data points of the validation amount. A quality measure is thus obtained for each data point of the validation variable.

Further, in step S4, a distance value to a nearest data point of the training amount is determined for each data point of the validation amount. The distance value is determined only with respect to a particular class of variables. That is, the spacing value with scalar variables corresponds to the simple difference or square difference to the corresponding class of variables in the nearest data point of the training amount. The closest data point of the training amount corresponds to the data point with the least distance value of the corresponding class of variables.

For time series or multi-dimensional classes of variables, the distance value between the data point to be evaluated of the validation amount and the data point of the training amount corresponds to, for example, a Euclidean distance. One now obtains a quality measure for each of the data points of the validation amount and a distance value for each class of variables. This is shown by way of the diagrams of FIGS. 3*a* to 3*c* for different classes of variables, wherein FIG. 3*a* corresponds to a scalar size of a pressure, the class of variables of FIG. 3*b* corresponds to a time series signal of an exemplary piezo sensor, and FIG. 3*c* of the class of variables of a time indication.

In step S5, a maximum of the quality measure is now determined in a median range of all distance values to a variable class. That is to say, particularly low distance values and particularly high distance values with regard to a class of variables are not taken into account in a maximum determination of the corresponding quality measure. For example, the total range of the distance values encountered may only be determined between 5% to 95%, preferably between 10% and 90% of the maximum distance value of the relevant class of variables. The distance values of maximum quality measures, whose relative ratios to one another determine the scale factors $w_1$, $w_2$, $w_3$ . . . for the distance metric, in particular after the distance values of maximum quality are normalized to one another, result as follows.

In particular, the largest of the distance values $A_k$ can be determined from the thus determined distance values of the $A_{max}$ classes of variables. This value corresponds to a weight of $w_1$. The quotients of the distance values $$w_k = \frac{A_{max}}{A_k}$$

determine the weights of the other classes of variables. In the figures is $A_{max}$ at 0.8, the other two peaks are at 0.1, thus the weight factors are 8 and 8 for time and pressure and 1 for the signal.

An example is a signal with three different classes of variables $x_1, \ldots, x_n$ as well as $y_1, \ldots, y_i$ and $z, \ldots, z_j$ given. The distance to a further signal is determined individually $[a_1, \ldots, a_n, b_1, \ldots, b_i, z_1, \ldots, z_j]$ for each variable class. Each of these distances is multiplied by the determined weights and then summed up together.

$$d([x_1, \ldots, x_n, y_1, \ldots, y_i, z_1, \ldots, z_j], [a_1, \ldots, a_n, b_1, \ldots, b_i, z_1, \ldots, z_j]) = w_1 d([x_1, \ldots, x_n], [a_1, \ldots, a_n]) + w_2 d([y_1, \ldots, y_i], [b_1, \ldots, b_i]) + w_3 d([z_1, \ldots, z_j], [z_1, \ldots, z_j])$$

Alternatively, scale factors $w_1$, $w_2$, $w_3$ . . . may be determined to balance the distributions of the quality measures over the distance values for each of the classes of variables from which the corresponding scale factors for the distance metric can also be determined after normalization. The scale factors $w_1$, $w_2$, $w_3$ . . . determined in this way may now be used in the anomaly detection model.

Figure 4:
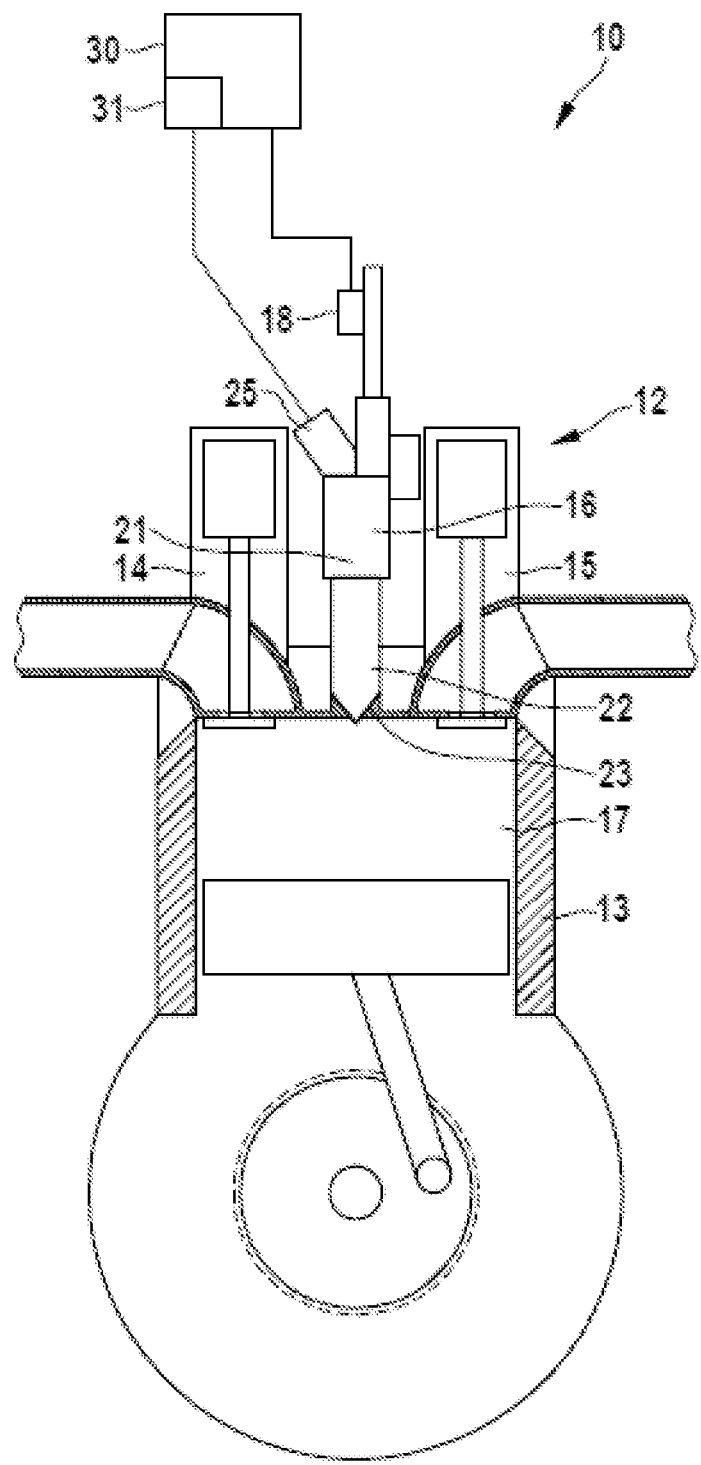
FIG. 4 shows an injection system having a sensor system and an anomaly detection according to FIG. 1.

FIG. 4 shows, as an example of a sensor system 1, an injection system 10 for an internal combustion engine 12 of a motor vehicle, for which a cylinder 13 (of in particular several cylinders) is shown by way of example. The internal combustion engine 12 is preferably configured as a direct-injection diesel engine but may also be provided as a gasoline engine.

The cylinder 13 has an intake valve 14 and an exhaust valve 15 for supplying fresh air and for exhausting combustion exhaust gas.

Furthermore, fuel for operating the internal combustion engine 12 is injected into a combustion chamber 17 of the cylinder 13 via an injection valve 16. To this end, fuel is supplied to the injection valve via a fuel supply 18, via which fuel is provided in a manner known per se (e.g., common rail) under a high fuel pressure.

The injection valve 16 has an electromagnetically or piezoelectrically controllable actuator unit 21 coupled to a valve needle 22. In the closed state of the injection valve 16, the valve needle 22 is seated on a needle seat 23. By controlling the actuator unit 21, the valve needle 22 is moved longitudinally and releases a portion of a valve opening in the needle seat 23 in order to inject the pressurized fuel into the combustion chamber 17 of the cylinder 13.

The injection valve 16 further has a piezo sensor 25 arranged in the injection valve 16. The piezo sensor 25 is deformed by pressure changes in the fuel supplied through the injection valve 16 and is generated by a voltage signal as a sensor signal.

The injection takes place in a manner controlled by a control unit 30 which specifies an amount of fuel to be injected by energizing the actuator unit 21. The sensor signal is sampled over time using an A/D converter 31 in the control unit 30, in particular at a sampling rate of 0.5 to 5 MHz.

Furthermore, a pressure sensor 18 is provided to determine a fuel pressure (rail pressure) upstream of the injection valve 16.

During operation of the internal combustion engine 12, the sensor signal is used to determine a correct opening- or closing time point of the injection valve 16. To this end, the sensor signal is digitized into an evaluation point time series using the A/D converter 31 and evaluated by a suitable sensor model, from which an opening duration of the injection valve 16 and correspondingly an injected fuel amount can be determined as a function of the fuel pressure and other operating variables. In particular, in order to determine the opening duration, an opening time point and a closing time point are needed in order to determine the opening duration as the time difference of these parameters.

An opening time point and/or a closing time point may be determined by considering the sensor signal time series of the sampled sensor signal. The opening time and/or the closing time can in particular be determined with the aid of a data-based system model. As additional condition variables, a rail pressure and a time indication at which an opening and/or closing of the injector 16 is actuated can be evaluated in the system model. The data point to be evaluated now contains the sensor signal time series of the scalar value of the rail pressure and the scalar value of the time indication.

Thus, in connection with the above sensor system 1, a training data point corresponds to the data point and a change point time as the opening and/or closing time for the label.

Figure 3A:
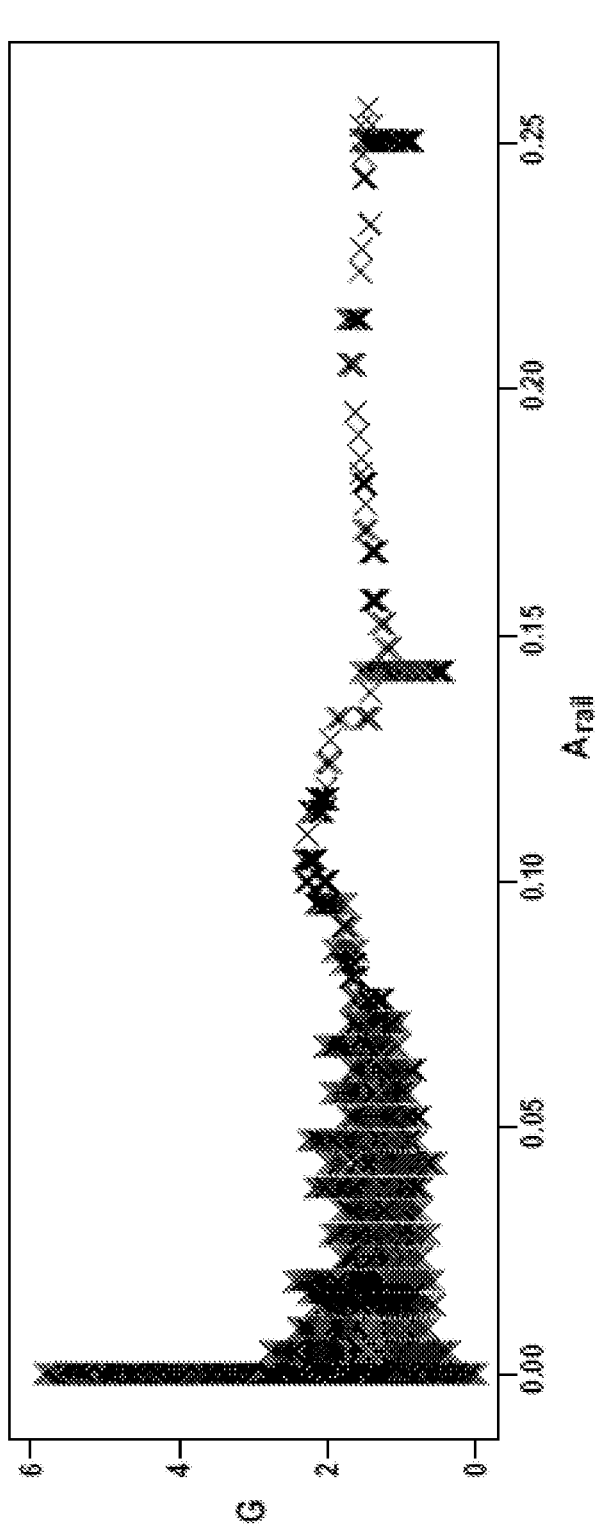
FIGS. 3a to 3c show diagrams for different classes of variables to show a distribution of the quality measure and a distance value limited to the respective class of variables.
Figure 3B:
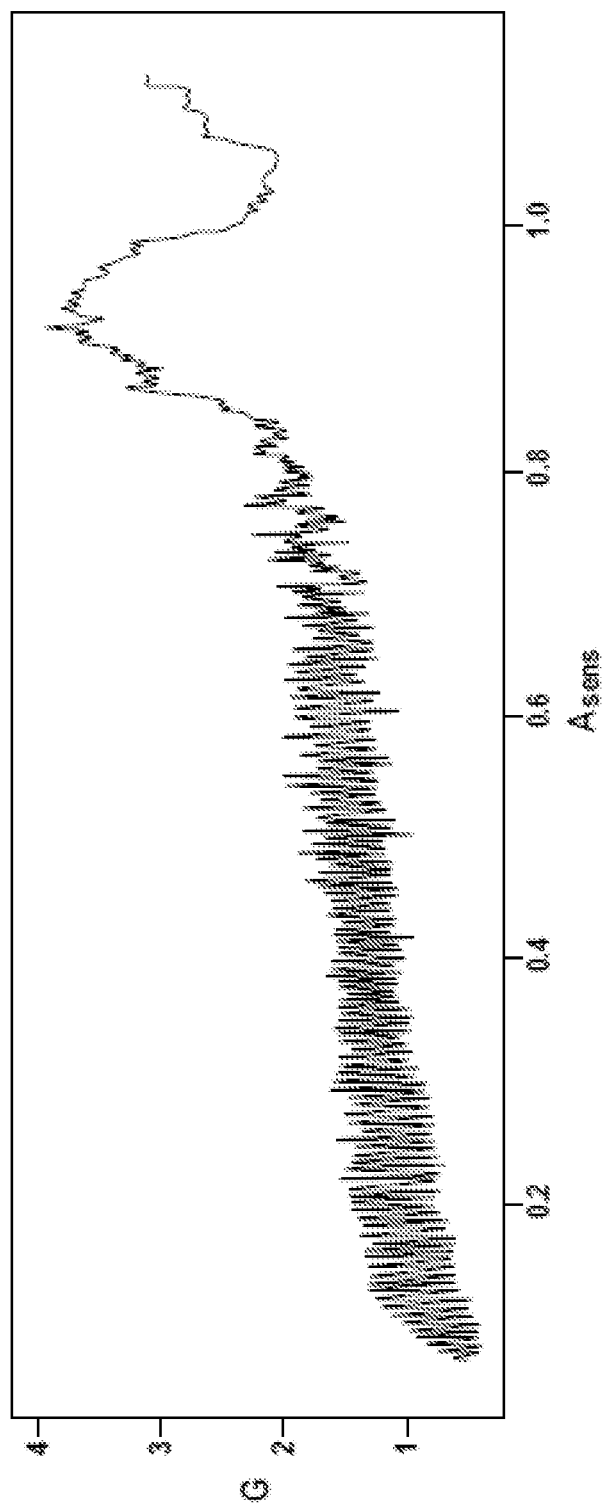
Figure 3C:
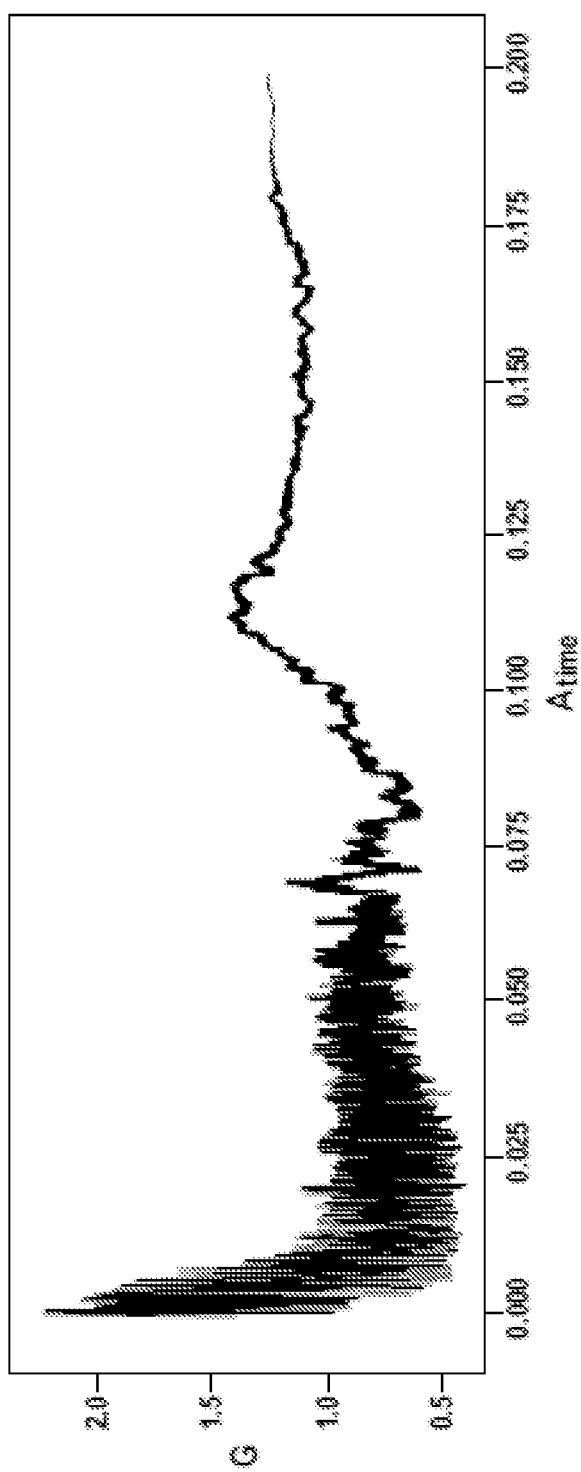

For the example of the above injection system 10, the distance metric for the classes of variables of the data point may be determined according to the above method. To determine the distance metric for the injection system 10, according to the above classification model, the quality measure G can be determined for each data point of the validation amount and the diagrams of FIGS. 3a to 3c determined therefrom. The diagram of FIG. 3a shows the distribution of the quality measure G over the distance value $A_{rail}$ of the rail pressure, FIG. 3b shows the distribution of the quality measure G over the distance value A. of the sensor signal time series of the piezo voltage, and FIG. 3c shows the distribution of the quality measure G over the distance value $A_{time}$ of the time indication. Each of the maxima of the quality distributions in FIG. 3a is marked at about 0.11, in FIG. 3b at about 0.9 and in FIG. 3c at about 0.115. This results in a distance metric according to the following calculation:

$$d([x_1, \ldots, x_{50}, t, p], [y_1, \ldots, y_{50}, s, q]) =$$
$$d([x_1, \ldots, x_{50}], [y_1, \ldots, y_{50}]) + 8.18d(t, s) + 8.18d(p, q) =$$
$$\sqrt{(x_1 - y_1)^2 + (x_{50} - y_{50})^2} +$$
$$8.18\sqrt{(t-s)^2} + 8.18\sqrt{(p-q)^2} \, [x_1, \ldots, x_{50}, t, p]$$

The distance between two signals: $[x_1, \ldots, x_{50}, t, p]$ and $[y_1, \ldots, y_{50}, s, q]$ Here, x and y are the first class of variables (the sensor signal), t and s are each a time parameter, and p and q are each of the pressure parameters.

This distance metric is now used for anomaly detection in the anomaly detection block 6 to determine an anomaly depending on a measure of distance of a data point of training data points.

What is claimed is:

1. A method for determining a distance metric for determining a distance to a data point to be evaluated having heterogeneous classes of variables, comprising:
providing training records partitioned into (i) training data points of a training amount, and (ii) validation data points of a validation amount, the training records each assigning a label to the training data points and the validation data points;
training a data-based system model with the training data points of the training amount, such that the data-based system model associates the training data points with a model output, respectively;
for each validation data point of the validation amount, determining (i) a quality level of the trained data-based system model, and (ii) a distance value to a nearest training data point for each of the heterogeneous classes of variables, wherein the distance value to the nearest training data point is determined separately with respect to a respective class of variables;
determining, for each of the heterogeneous classes of variables, a corresponding quality distance value of the determined distance values as the determined distance value having a maximum quality level for the corresponding class of variables of the heterogeneous classes of variables;
determining the distance metric as an output of a function that receives each of based on the determined quality distance values; and
using the distance metric to evaluate a plurality of data points of a training data space to find gaps in the training data space, or to determine outliers of the plurality of data points of the training data space, such that additional training data for training the data-based system model is generated.

2. The method according to claim 1, wherein:
the validation data points are included in respective validation data sets based on the corresponding assigned label, and
a quality measure for a respective validation data set is determined based on a difference between the model output of the data-based system model with respect to the label of the respective validation data set.

3. The method according to claim 1, wherein:
a data point comprises several classes of variables each corresponding to a single physical variable, a time series of a physical variable, image data of an imaging institution, or moving image data of the imaging institution, and
at least two of the classes of variables have ranges of values of the associated values that deviate by more than 50% of each other.

4. The method according to claim 1, wherein the distance value to the nearest training data point is determined as a Euclidean distance with respect to the respective class of variables at multi-dimensional variables.

5. The method according to claim 1, wherein the distance value having the maximum quality level for each of the heterogeneous classes of variables is determined only in a range between 5% and 95% of the maximum distance value for the respective class of variables.

6. The method according to claim 1, wherein the distance metric is further used for a determination of anomalies based on a distance dimension of a corresponding data point to be evaluated using the distance metric of further data points.

7. A device for carrying out the method according to claim 1.

8. A computer program product including instructions which, when executing the computer program product by a computer, cause the computer to execute the method according to claim 1.

9. A non-transitory machine-readable storage medium comprising instructions which, when executed by a computer, cause the computer to execute method according to claim 1.

10. The method according to claim 1, further comprising:
generating an anomaly signal as an output of an anomaly detection block of a technical system by processing the determined distance metric and a plurality of the data points to be evaluated,
wherein the technical system is a sensor system of an internal combustion engine, the sensor system including a plurality of sensors,
wherein the anomaly detection block is included in the sensor system, and
wherein an injection system of the internal combustion engine is operated based on the anomaly signal.

11. The method according to claim 10, wherein the heterogeneous classes of variables include (i) a rail pressure upstream of an injection valve of the injection system as determined by a first sensor of the plurality of sensors, (ii) a sensor signal of an actuator unit of the injection valve as provided by a second sensor of the plurality of sensor, and (iii) a time indication at which an opening and/or closing of the invention valve occurs as provided by a third sensor of the plurality of sensors.

12. The method according to claim 1, further comprising:
generating an anomaly signal as an output of an anomaly detection block of a technical system by processing the determined distance metric and a plurality of the data points to be evaluated; and
detecting an anomaly using the anomaly detection block when a distance measure determined from the determined distance metric and a corresponding data point of the plurality of data points is above a predetermined anomaly wave.

13. The method according to claim 1, wherein the distance metric is determined as an output of the function that receives three of the determined quality distance values each from a different class of variables of the heterogeneous classes of variables.

14. The method according to claim 1, further comprising:
further training the data-based system model with the additional training data.

* * * * *